(12) United States Patent
Seibert et al.

(10) Patent No.: US 11,402,829 B2
(45) Date of Patent: Aug. 2, 2022

(54) DIGITAL PLATFORM, COMPUTER PROGRAM PRODUCT AND METHOD FOR INTEGRATING DATA FROM ASSETS TO A TECHNICAL INSTALLATION INTO THE DIGITAL PLATFORM

(71) Applicant: Siemens Aktiengesellschaft, Munich (DE)

(72) Inventors: Eckhard Seibert, Hagenbach (DE); Rahul Sharma, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/275,716

(22) PCT Filed: Sep. 12, 2019

(86) PCT No.: PCT/EP2019/074359
§ 371 (c)(1),
(2) Date: Mar. 12, 2021

(87) PCT Pub. No.: WO2020/053336
PCT Pub. Date: Mar. 19, 2020

(65) Prior Publication Data
US 2022/0057782 A1    Feb. 24, 2022

(30) Foreign Application Priority Data
Sep. 13, 2018   (EP) .................................... 18194255

(51) Int. Cl.
*G05B 19/418*   (2006.01)
*G05B 17/02*   (2006.01)
(52) U.S. Cl.
CPC ......... *G05B 19/4188* (2013.01); *G05B 17/02* (2013.01); *G05B 2219/31334* (2013.01)

(58) Field of Classification Search
CPC ............... G05B 19/4188; G05B 17/02; G05B 2219/31334; G05B 2219/32158; Y02P 90/02
See application file for complete search history.

(56) References Cited

U.S. PATENT DOCUMENTS 10,819,556 B1 * 10/2020 Rangasamy ........ H04L 41/0226
2011/0264282 A1   10/2011 Blank et al.
(Continued)

FOREIGN PATENT DOCUMENTS

DE    102009052840    5/2010
EP       2565740       3/2013

OTHER PUBLICATIONS

PCT International Search Report dated Dec. 20, 2019 based on PCT/EP2019/074359 filed Sep. 12, 2019.

*Primary Examiner* — Chad G Erdman
(74) *Attorney, Agent, or Firm* — Cozen O'Connor

(57) ABSTRACT

A method for integrating data from assets of a technical installation into a platform, wherein general models are initially defined for the assets of domain-specific technical installations, where data from the identified general data sources are then assigned to previously defined general models, an asset is then selected for a specific installation and the corresponding general model is imported into the platform, the data sources of the specific installation are configured such that a general model can be iteratively filled at runtime with the specific data relating to this installation for the selected asset based on data sources of specific installations, entities for the selected asset are formed by filling the general model with the specific data and stored in the platform, and where the asset entities are configurable in the platform, such that applications can access asset entities and the data thereof without any problems via programming interfaces.

12 Claims, 2 Drawing Sheets

(56) References Cited

U.S. PATENT DOCUMENTS

| | | |
|---|---|---|
| 2013/0282190 A1 | 10/2013 | Conroy et al. |
| 2017/0192414 A1* | 7/2017 | Mukkamala ........ H04L 63/0876 |
| 2020/0004217 A1* | 1/2020 | Eickhoff ............ G05B 19/0423 |

* cited by examiner

DIGITAL PLATFORM, COMPUTER PROGRAM PRODUCT AND METHOD FOR INTEGRATING DATA FROM ASSETS TO A TECHNICAL INSTALLATION INTO THE DIGITAL PLATFORM

CROSS-REFERENCE TO RELATED APPLICATIONS

This is a U.S. national stage of application No. PCT/EP2019/074359 filed 12 Sep. 2019. Priority is claimed on European Application No. 18194255.8 filed 13 Sep. 2018, the content of which is incorporated herein by reference in its entirety.

BACKGROUND OF THE INVENTION

1. Field of the Invention

The invention relates to a method for integrating data from assets of a technical installation into a platform, a corresponding platform, and to a computer program product that is loadable directly into the internal memory of a digital computer.

2. Description of the Related Art

An industrial installation normally has a lifecycle of 20 to 60 years. The installation is typically established incrementally in several phases, where different participants that can be internal and external partners or service providers are involved. Each stakeholder brings or uses heterogeneous software tools and technologies for the planning, configuration, controlling, administration and monitoring of the respective installation parts or operating resources of a technical installation, which are known as "assets".

The term asset is mostly used in the process industry, e.g., in the chemical, pharmaceutical, petrochemical and food and beverage industry. Assets at the level of an installation part refer, for example, to field devices, machines, rotating and static machine parts, computer hardware or software such as operating or user programs. The entire lifecycle of an asset generally includes the planning, engineering, procurement, commissioning, operating, exchange and disposal phases. The term asset management is often defined by tasks and objectives such as generating and providing information, in particular on the development and prognosis of the asset health, the organization of deployment and the maintenance of the assets and the administration of the assets throughout the entire lifecycle. Identification, asset history, operational and technical data of the assets are often of particular interest with the aim of increasing reliability and efficiency, reducing the need for replacement and value creation by extending the use of a technical installation.

A large proportion of the investments in industrial installations currently flows into modernizing installations to avoid unplanned decommissioning of installations or parts of installations, which can lead to significant losses and in some cases also to penalties.

However, solutions currently available for the servicing or maintenance of assets of a technical installation have multiple problems. They therefore mostly only target individual assets without taking their context into consideration. Assets are often produced by heterogeneous providers, resulting in only different providers being able to provide the expertise for understanding the assets, the data produced and failure predictions. Onboarding, i.e., the configuration of assets before commissioning, mostly occurs manually in these applications thus resulting both in effort and expenditure as well as time and errors. The information required for predicting an abnormal operation of an asset requires additional measurements that are usually not available in the control system of the technical installation. This requires additional engineering and, if necessary, a reconfiguration of the control system, which not only costs money but also includes unforeseen risks. Furthermore, it is difficult to keep a heterogeneous database consistent and up-to-date.

It would therefore be desirable to optimize the maintenance of an industrial installation based on all available data. If the full functionality of all available assets is ensured, then a reliable and efficient operation can be ensured. In this way, increases in production and where applicable better process educts can be achieved. There is therefore a need to combine data from various sources and to adapt this data such that applications that need these various items of data can work more effectively. In particular, specific asset-specific applications should have the data available which they need for the analysis of an asset.

US 2013/0282190 A1 discloses a system and method for configuring and managing assets from a power plant. Starting from a list that is based on a model of the technical installation, assets are selected and hierarchical relationships between at least one part of the selected assets are defined. Asset configurations are then defined based on the asset selection and the previously defined relationships.

SUMMARY OF THE INVENTION

In view of the foregoing, it is therefore an object of the present invention to provide a method and a suitable system that efficiently and comprehensively accesses different data from assets within a technical installation and efficiently further processes the data to ensure an improved data analysis and an improved lifecycle management of the assets.

This and other objects and advantages are achieved in accordance with the invention by a digital platform, a computer program product and a method for integrating data from assets of a technical installation into a platform in which general models are initially defined for the assets of domain-specific technical installations via ontologies and in which general data sources containing information in connection with the assets are identified. The data from the identified general data sources is then mapped to the previously defined general models. An asset is then selected for a specific installation and the corresponding general model is imported into the platform. The data sources of the specific installation are then configured such that the general asset model can be filled iteratively at runtime with the specific data relating to this installation for the selected asset based on the data sources of the specific installation. Instances for the selected asset are formed by filling the general model with the specific data and are stored in the platform. The asset instances can now be easily configured in the platform, with the result that any desired applications can access the asset instances and the data thereof without any problems via programming interfaces.

Here, the term "general" is to be understood in the sense of generic or generally valid. A general asset model of a pump, for example, would include a comprehensive description of a pump, in the sense that the general characteristic features of a pump or information in conjunction with a valve and the connections that exist between these features and items of information are captured by the model.

Here, the term "specific" relates to a specific technical installation. Whereas in the general model a valve is described in general terms (has shut-off unit, actuator, position controller), the valves within a considered specific installation have certain tags and they have specific features which are relevant for the considered installation from a specific industry (e.g., refinery, paper mill, coal-fired power station): The shut-off unit is a slider from company Y, the actuator is a piezo drive from company P and the controller is a proportional-integral-derivative controller (PID) controller from company Z.

The advantages of the invention are that, on the basis of the general asset models and/or connection models formed at the beginning, the data from assets of the most varied manufacturers, which is stored in a multitude of the most varied systems, can be integrated efficiently and simply into a common platform. As soon as the asset instances are available, the data is harmonized and can be easily further processed. Applications can now easily access the harmonized asset data via programmable interfaces so that it can be used for any evaluations and analyses. Such an efficient data integration into a platform has the further advantage that it is particularly suited to cloud applications. A platform configured inn accordance with the invention, in particular a cloud platform, forms the basis for diverse, comprehensive analyses throughout the entire lifecycle of an asset. In addition, onboarding a new asset into a technical installation is significantly simplified and optimized because, once the general asset model has been created, it simply has to be filled with only the specific data from the installation and the corresponding instances for the asset to be newly onboarded have to be created and stored in the platform. This significantly reduces the effort related to onboarding the asset.

In an advantageous embodiment of the invention, the static data from the specific installation is initially mapped to the general models and then the dynamic data, where the static data is taken from an installation engineering system, a maintenance management system or an archive with data does not change or remains unchanged over time from the technical installation and the dynamic data is taken from a control system, a diagnostic system, a process data management system or a data storage with process values, measurement values, diagnostic data, maintenance data and other data which changes over time from the technical installation. The advantage of this procedure is that it is easier to integrate the dynamic data if the general model is already filled with static data.

In a further advantageous embodiment of the invention, the general models for the assets comprise at least one model that describes the structure and behavior of the asset and/or one model that characterizes the connections of the asset in the entire system and that is suitable for configuring dynamic data sources of the installation. The more aspects the general models comprise, the more extensive, more precise and more exact is the description of the asset. Furthermore, specific characteristics of an asset can be better described via the different models. The static and dynamic behavior of an asset can therefore be optimally mapped, for example, as in this exemplary embodiment.

Any desired applications can advantageously access the data and instances of the assets on the platform via an access layer. In this way, the access can be established in the context of the provider of the platform, which represents a significant flexibility. In a particularly advantageous embodiment of the invention, a search machine is interconnected when accessing the data on the platform, via which the access to the relevant data of the selected asset can be established more easily and in particular context-specific searches per asset can be performed. This results in high user friendliness and a user of the platform can obtain the required information more quickly.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will now be described and explained in greater detail making reference to the figures, in which.

DETAILED DESCRIPTION OF THE EXEMPLARY EMBODIMENTS

Figure 1:
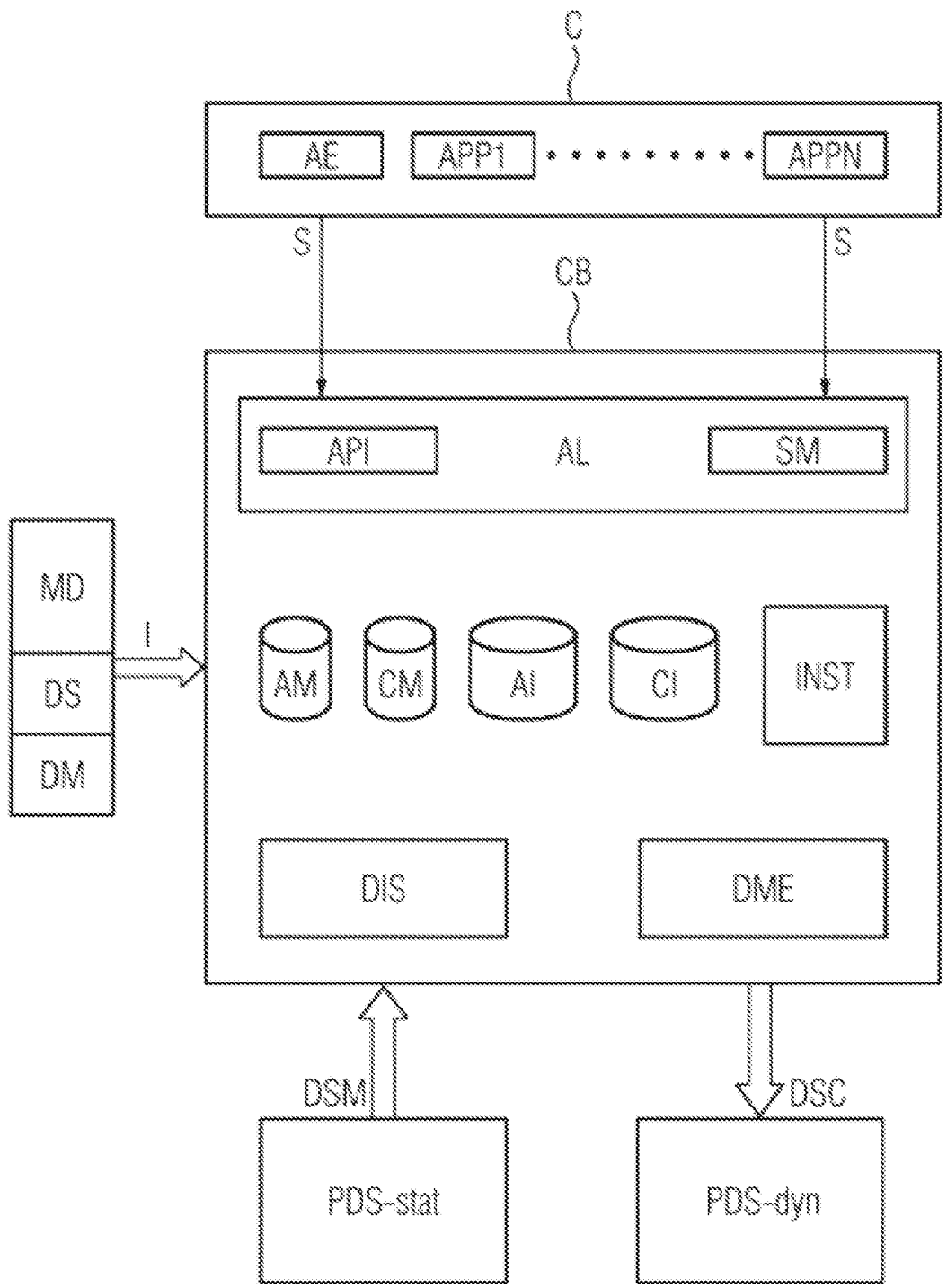
FIG. 1 shows a schematic block diagram of an infrastructure for integrating data in accordance with an embodiment of the present invention.

FIG. 1 shows a functional block diagram of an embodiment of the present invention that allows the integration of data from different assets of a technical installation. The technical installation can be an installation of the process industry, e.g., in the chemical, pharmaceutical, petrochemical or the food and beverage industry sectors. Installations of the oil and gas industry or power generation are included as are installations of the manufacturing industry. Such technical installations are mostly controlled and monitored via an automation system.

The inventive system can, for example, be realized in the form of a software platform with software components. The platform CB comprises an access layer AL in the highest hierarchy. The access layer provides application programming interfaces APIs for accessing the required data. The APIs are program parts that are made available by the platform CB to other programs for connection to the system. For example, for a valve monitoring application there can be APIs that can query all valves produced by a specific manufacturer A that are located at functional location XYZ. The access layer AL is not static and can be dynamically expanded if the generation of newly required domain-specific APIs based on the application requirements is necessary. An API of the access layer AL can also be generated automatically based on the AM. Furthermore, the access layer AL can include a search machine SM that is configured in the usual manner and allows a user of the platform to perform context-specific searches for an asset.

The configuration of the APIs can occur in a separate software component C. The applications App1 to AppN and an asset explorer AE that regulates access to the data of the individual assets are stored here. Typical asset-specific applications help the maintenance personnel of a technical installation to monitor assets, such as valves, pumps or motors. The component C is connected to the backbone CB via one or more interfaces S.

In addition to the access layer AL, the inventive platform CB comprises different data models via which the assets of the technical installation can be characterized. These models should explicitly model the entities, types and relationships of the assets in machine-interpretable format. Ontologies are used to define these models. In information technology, ontologies are mostly designated as representations of a number of terms, formulated into words and formally arranged, and the relationships that exist between them in a specific subject area. An "asset model" AM should therefore model in general form an asset of the technical installation, e.g., a hardware component in the field. The "asset model" AM is a normalized data model for an asset (such as a valve, or pump) that semantically represents and defines all relevant characteristics/attributes (including the relationship between these) of an asset. It accordingly combines relevant information from different data sources such as static information from the function plans of the technical installation, dynamic information (e.g., from the maintenance management system) and dynamic data such as measurement values or diagnostic data. The asset models are oriented toward international standards of the process industry, such as the International Electrotechnical Commission (IEC) standard 51756, DEXPI, NAMUR-MTP, and the like.

Furthermore, the software platform CB in this exemplary embodiment also includes a connection model CM that contains the data connections of an asset. The connection model CM includes only dynamic data from different data sources, e.g., diagnostic data and/or process data from different control systems or archives.

The general models AM and CM can, for example, be created in an Web Ontology Language (OWL) format.

To aid comprehension, the model definition MD (FIG. 1) is shown by way of example for the asset of a valve. The model definition MD can be performed outside of the platform CD. In this embodiment, all the structural information for a valve system is initially collated and a comprehensive description of a valve system is created:

- A valve is a component for shutting off or controlling the flow rate of fluids.
- A valve system consists at least of a shut-off unit or sealing part (often designated as a valve), an actuator and often also a position controller.
- It is arranged at a location with specific coordinates x, y, z within a technical installation.
- Sensors are connected to the valve: Here, measured variables of the sensors can, for example, be the flow rate through the line influenced by the valve before and after the valve. The temperature of the fluid can be measured.
- A flag can also be indicated for the status of the valve (Boolean variable: 0=out of operation, 1=full function)
- Further diagnostic (operating time, wear and tear) or calculated KPIs (control accuracy) can be indicated. (KPI=key performance indicator)

Such information can be captured via the "Unified Modeling Language" (UML) programming language. UML is a language that defines identifiers for the most important terms in the context of a modeling and defines possible relationships between these terms.

In another exemplary embodiment, standards can also be used for the model definition. With these standards, it is a matter of general templates for the structure of assets and their relationships, which can be reused time and again with different assets. Ideally the standards exist for assets in different embodiments so that they only have to be adjusted to the requirements of a specific asset.

Once the structures of an asset with all of its terms and relationships between the terms according to the described or another suitable algorithm have been captured as a concept model, they are transferred into a semantic environment and ontologies are created. This can occurs, for example, via the "Web Ontology Language" (OWL).

OWL is a semantic web language that can represent complex knowledge about things, groups of things and relationships between things. OWL is a language based on computer logic. Accordingly, knowledge expressed in OWL can be used by other computer programs in order, for example, to verify the consistency of this knowledge or to express implicit knowledge explicitly.

With OWL, the previously combined and structured terms of a domain (here the terms relating to a valve system) and their relationships can be described such that another software system can process the meaning, in other words understand the terms.

The ontology creation completes the definition of a general model for an asset (AM) and its connections (connection model CM).

In a next step, generally relevant data sources are identified (data source DS in FIG. 1). In addition, the data that is to be mapped to the respective general data sources is identified (data mapping DM in FIG. 1). These steps can also be performed externally (outside the platform CB). This exemplary embodiment primarily relates to databases of the control system of the technical installation or databases with engineering data that contain the complete asset information for the establishment and configuration of the installation, its hardware and software and electrotechnical information. Here, relevant data sources furthermore include enterprise resource planning (ERP), manufacturing execution (MES) systems, computerized maintenance management (CMMS) systems or product data management (PDM) systems, which store and manage product-defining, product-representing and product-presenting data as a result of product development and make it available in downstream phases of the product lifecycle. Also conceivable are diagnostic tools and databases in conjunction with sensors and monitoring algorithms with their respective data.

Following the definition of the general asset and connection models and the identification of the general data sources with the mapped data thereof, an import I of the models AM and CM and the mapped data into the platform CB occurs, provided the previously described steps were performed outside of the platform. To this end, "data ingestion services" (DIS) are implemented, which allow, for example, the "streaming" of large volumes of data into a data storage or a cloud platform. The data streams reach the data storage or the platform either continuously in real time or in batches. Such data capture services can also help with the prioritization of data sources, the validation of individual items of data and files and the forwarding of data to a predetermined target. The import I can, for example, be performed after selection of a specific asset (here valve). An input mask is provided in the platform CB for selecting an asset. The general models AM and CM can be stored in a storage component (i.e., data storage) or a library of the platform CB.

The data sources of the specific installation (i.e., installation of which the assets are to be analyzed) are then configured such that the general asset model can be iteratively filled at runtime with the specific data from this installation for the selected asset based on the data sources of the specific installation. The "filling" of the models AM and CM occurs via a data mapping engine DME, a component of the platform CB that handles the mapping of the specific data from the specific installation which is to be analyzed to the general models AM and CM.

When mapping the data of the data sources from the specific installation to the asset models, tools from the semantic web which are based on W3C standards are also used. One example of this is the W3C standard R2RML-RDB-RDF mapping language.

For the valve monitoring of this exemplary embodiment, a mapping of the data from the following data sources is advantageous:

Relevant information from the piping schematic diagram from the engineering model.

Installation topology and network information from the engineering station PCS7.

Service and maintenance data from the CMMS system, e.g., SAP system.

In general, static and dynamic data sources from a technical installation can be differentiated. The static data sources from an installation PDS-stat (plant data sources) provide installation instrumentation data, installation planning data, manufacturing data etc. and mostly come from an installation engineering system, a maintenance management system or a data storage with data which does not change or remains unchanged over time from the technical installation. The dynamic data sources from an installation PDS-dyn provide operational data, sensor data, diagnostic data etc. and mostly come from the control system of the technical installation or a diagnostic system, a process data management system or a data storage with process values, measurement values, diagnostic data, maintenance data and other data which changes over time from the technical installation.

By configuring the specific data sources DSC (data source configuration) and mapping the static and dynamic data from the corresponding specific data sources DSM (data source mapping), the general models AM and CM are filled and hence instances are created.

The term "instance" is used to describe a concrete object. In object-oriented programming (OOP), an object describes, an example, of a particular data type or a particular class (also known as "object type"). Objects are concrete versions ("instances") of an object type and are created during runtime, which is known as instantiation. Accordingly, if (as in the present exemplary embodiment) a general model was defined for the asset "valve" and was then filled with the data from a specific installation, such as an installation from the chemical industry, then the asset "valve" represents the class or the object type and the inlet valve with shut-off valve, lever and throughput control from company W. at a specific location of the installation is a particular version and is therefore an asset instance.

These instances, asset instances AI and connection instances CI, are stored in the corresponding data storage units (i.e., storage component) of the platform CB. With a separate component INST within the platform CB, the instances in the platform can be configured such that any application App1, App2 or AppN can access the asset instances AI or CI and the data thereof via a programming interface API.

Figure 2:
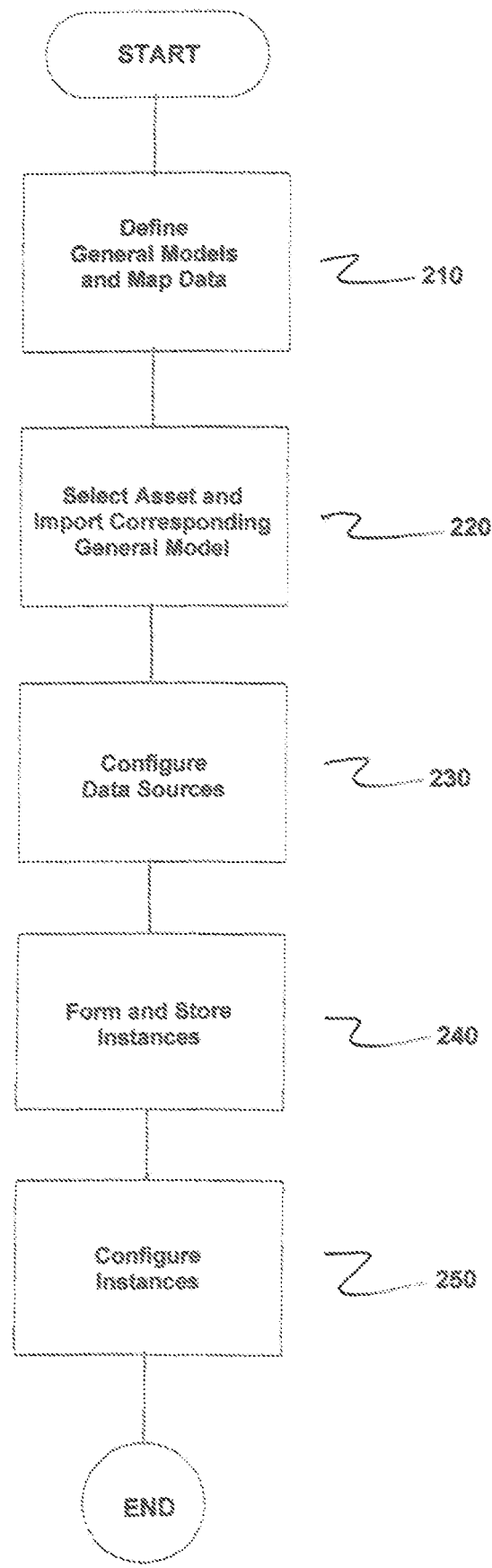
FIG. 2 is a flowchart of the method in accordance with the invention.

FIG. 2 is a flowchart of the method for integrating data from assets of a technical installation into a platform CB. The method comprises defining general models AM, CM for assets of a domain-specific technical installation via ontologies and general data sources containing information in connection with the assets are identified, and mapping data from the identified general data sources to the previously defined general models AM, CM, as indicated in step 210.

Next, an asset for a specific installation is selected and the corresponding general model AM, CM is imported into the platform CB, as indicated in step 220.

Next, data sources from the specific installation are configured such that the corresponding general model AM, CM is iteratively filled at runtime with the specific data from the specific installation for the selected asset based on the data sources of the specific installation, as indicated in step 230.

Next, instances AI, CI for the selected asset are formed by filling the general model AM, CM with the specific data and the formed instances AI, CI are stored in the platform CB, as indicated in step 240.

Next, instances AI, CI for the selected asset are configured in the platform CB such that applications App1, . . . , AppN can access the instances AI, CI for the selected asset and the data thereof via programming interfaces S, API.

Although the invention has been illustrated and described in detail based on the preferred exemplary embodiment, the invention is not restricted by the examples given. Variations thereof can be derived by a person skilled in the art without departing from the protective scope of the invention as defined by the following claims.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for integrating data from assets of a technical installation into a platform, the method comprising:

defining general models for assets of a domain-specific technical installation via ontologies and general data sources containing information in connection with the assets are identified, and mapping data from the identified general data sources to the previously defined general models;

selecting an asset for a specific installation and importing a corresponding general model into the platform;

configuring data sources from the specific installation such that the corresponding general model is iteratively filled at runtime with the specific data from the specific installation for the selected asset based on the data sources of the specific installation;

forming instances for the selected asset by filling the general model with the specific data and storing said formed instances in the platform; and configuring instances for the selected asset in the platform such that applications can access the instances for the selected asset and the data thereof via programming interfaces.

2. The method as claimed in claim 1, wherein static data from the specific installation is initially mapped to the defined general models and dynamic data is subsequently mapped;

wherein the static data is taken from an installation engineering system, a maintenance management system or a data storage with data which remained unchanged over time from the technical installation and the dynamic data is taken from a control system, a diagnostic system, a process data management system or a data storage with process values, measurement values, diagnostic data, maintenance data and other data which changes over time from the technical installation.

3. The method as claimed in claim 1, wherein the general models for the assets comprise at least one of (i) at least one model which describes a structure and a behavior of the asset and (ii) one model which characterizes connections of the asset in an entirety of a system and which is suitable for configuring dynamic data sources of the installation.

4. The method as claimed in claim 2, wherein the general models for the assets comprise at least one of (i) at least one model which describes a structure and a behavior of the asset and (ii) one model which characterizes connections of the asset in an entirety of a system and which is suitable for configuring dynamic data sources of the installation.

5. The method as claimed in claim 1, wherein the data and the asset instances of the platform are accessible by applications via an access layer.

6. The method as claimed in claim 5, wherein when accessing the data on the platform, a search machine is interconnected, via which a context-specific search per asset is performed.

7. A computer program product which is loadable into internal memory of a digital computer and which comprises software code sections which if executed when executed computer program product is running on the digital computer causes performance of the method of claim 1.

8. A digital platform for integrating data from assets of a technical installation, comprising:

interfaces (I) for importing previously defined general models for assets of a domain-specific technical installation, the general models being previously defined for the assets of a domain-specific technical installation via ontologies and general data sources containing information in connection with the assets being previously identified, and the data from the identified general data sources being previously mapped to the previously defined general models;

an access layer which is configured such that any application of a plurality of applications can access the platform via programming interfaces;

further interfaces for exchanging static and dynamic data from any data sources from a specific technical installation;

components which configure the data sources from the technical installation for a selected asset and the general model thereof such that the general model for the selected asset is iteratively filled at runtime with the specific data relating to said technical installation for the selected asset based on the data sources of the technical installation;

wherein instances for the selected asset are formed by filling the general model with the specific data and are stored in the platform; and wherein the instances for the selected asset in the platform are configured such that any application of a plurality of applications can access the instances for the selected asset and the data thereof.

9. The digital platform as claimed in claim 8, further comprising:

calculation components which are available for mapping the static and dynamic data from the specific technical installation to the respective general models.

10. The digital platform as claimed in claim 8, wherein the data sources from the technical installation include one of (i) an installation engineering system, a maintenance management system or a data storage with data which remains unchanged over time from the technical installation and (ii) a control system, a diagnostic system, a process data management system or a data storage with process values, measurement values, diagnostic data, maintenance data and other data which changes over time from the technical installation.

11. The digital platform as claimed in claim 8, wherein the general models for the assets comprise at least one of (i) at least one model which describes the structure and the behavior of the asset and (ii) one model which characterizes connections of the asset in an entirety of the system.

12. The digital platform as claimed in claim 8, wherein the access layer comprises a search machine for performing a context-specific search per asset.

* * * * *